A. C. HAYWARD.
CLUTCH OR FREE WHEEL MECHANISM.
APPLICATION FILED JAN. 6, 1921.

1,381,876.

Patented June 14, 1921.

Inventor.
Albert C. Hayward.
by Atty.

UNITED STATES PATENT OFFICE.

ALBERT CHARLES HAYWARD, OF ASHFORD, ENGLAND.

CLUTCH OR FREE-WHEEL MECHANISM.

1,381,876.　　　　Specification of Letters Patent.　Patented June 14, 1921.

Application filed January 6, 1921. Serial No. 435,473.

(GRANTED UNDER THE PROVISIONS OF THE ACT OF MARCH 3, 1921, 41 STAT. L., 1313.)

*To all whom it may concern:*

Be it known that I, ALBERT CHARLES HAYWARD, a British subject, of 29 Hunter road, Willesborough, Ashford, in the county of Kent, England, have invented certain new and useful Improvements in or Relating to Clutches or Free-Wheel Mechanism, of which the following is a specification, such as will enable others skilled in the art to which it appertains to make and use the same.

This invention relates to two-way free wheel clutches for driving vehicles and is of that kind in which pivotally mounted blocks or equivalents, and which I will call shoes, are adapted to be expanded against some part of the hub of the wheel, said shoes being mounted upon a disk or equivalent arranged upon a sleeve on the driving shaft.

I expand the shoes by means of a cam-like block of known or convenient form but I construct my clutch with the disk free on the axle and with the disk, the shoes and cam within the hub of the wheel and employ the inner surface of the hub as the outer member of the clutch so that I can inclose all the mechanism of the clutch within the hub and keep it free from grit or other extraneous matter.

An example of my invention is shown in the accompanying drawings in which—

Figure 1:
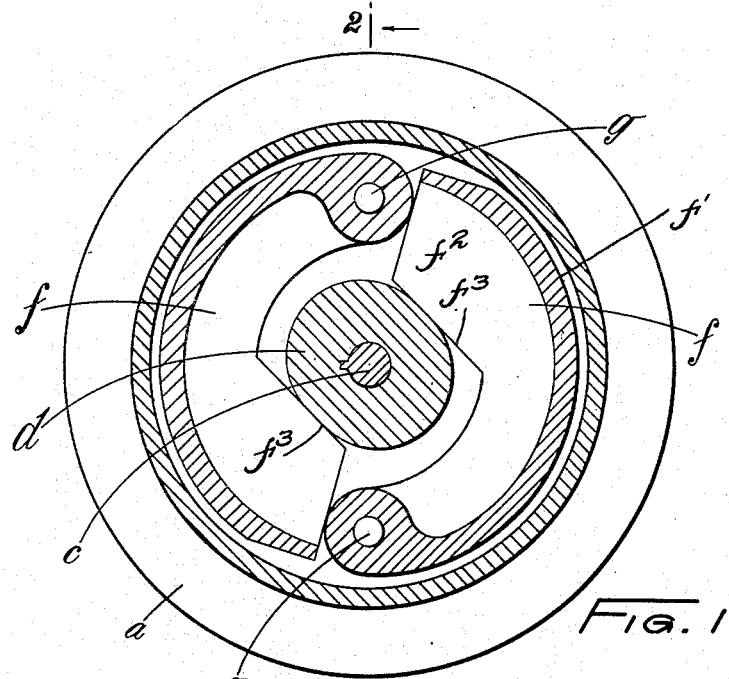
Figure 2:
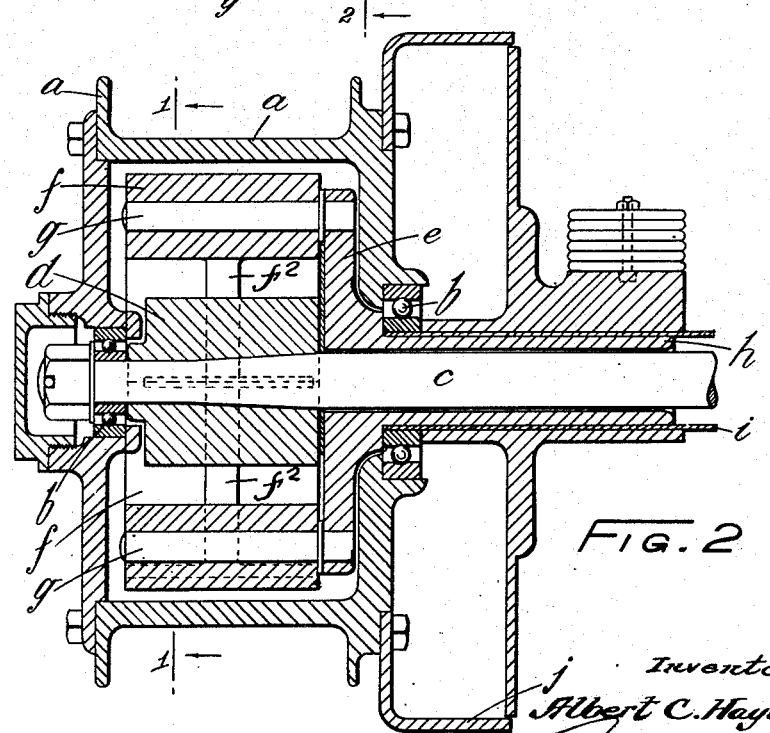

Figure 1 is a view in section at right angles to the driving shaft and is substantially on the line 1—1 of Fig. 2 while Fig. 2 is a section substantially on the line 2—2 of Fig. 1.

In these drawings the hub $a$ of the driven wheel, say the wheel of a motor vehicle is mounted upon ball bearings at $b$ $b$ and is normally free to rotate in either direction.

The driving axle or shaft $c$ has fixed to it an ellipse or cam $d$ and between the axle and the said hub a disk $e$ is fitted and carries two shoes or blocks $f$ which are pivoted to the disk at $g$. A sleeve $h$ from the disk $e$ is arranged over the shaft $c$ and within the usual axle casing $i$. A brake drum is shown at $j$. The shoes $f$ are formed to provide brake flanges or portions $f'$, with inwardly extending web portions $f^2$, the inner edges of the respective web portions being formed to provide substantially parallel bearing faces to coöperate with the cam $d$. These bearing faces have opposite bearings on the cam on a diametric line substantially at a 45° angle to the diametric line joining the pivots of the shoes. Springs may be used to remove the shoes from contact with the hub when not held out by the cam.

It will be seen that the whole of the clutch proper is of simple construction and can be entirely inclosed within the hub of the wheel.

The shape of the parts may vary considerably and modifications may be made within the scope of the following claims.

What I claim is:—

1. A two-way free wheel clutch for the wheels of motor vehicles comprising a member mounted directly on and adapted for free independent rotation with respect to the driving axle, frictional shoes pivotally supported at diametrically opposite points on said member, a drum carried by the wheel to be engaged by said shoes, the pivotal terminal of each shoe forming a limit for the non-clutch position of the other shoe, and a cam fixed on the axle and coöperating with the shoes in a line substantially at a forty-five degree angle to their pivots to force the shoes into frictional engagement with the drum.

2. A two-way free wheel clutch for the wheels of motor vehicles comprising a disk mounted for free rotation on the axle, shoes pivotally supported at diametrically opposed points on the disk, a drum to be engaged by the shoes, said shoes having an inwardly extending web portion, the web portions of the respective shoes being formed to provide bearing faces substantially parallel and at an angle to the diametric line connecting the pivots of the shoes, and a cam secured on the axle and coöperating with said bearing faces.

In witness whereof I have hereunto set my hand in presence of two witnesses.

ALBERT CHARLES HAYWARD.

Witnesses:
ELIZABETH PARRY,
HENRY FAIRBROTHER.